B. NORTON.
CONVEYER.
APPLICATION FILED NOV. 4, 1910.
1,041,507.
Patented Oct. 15, 1912.
Fig. 1.
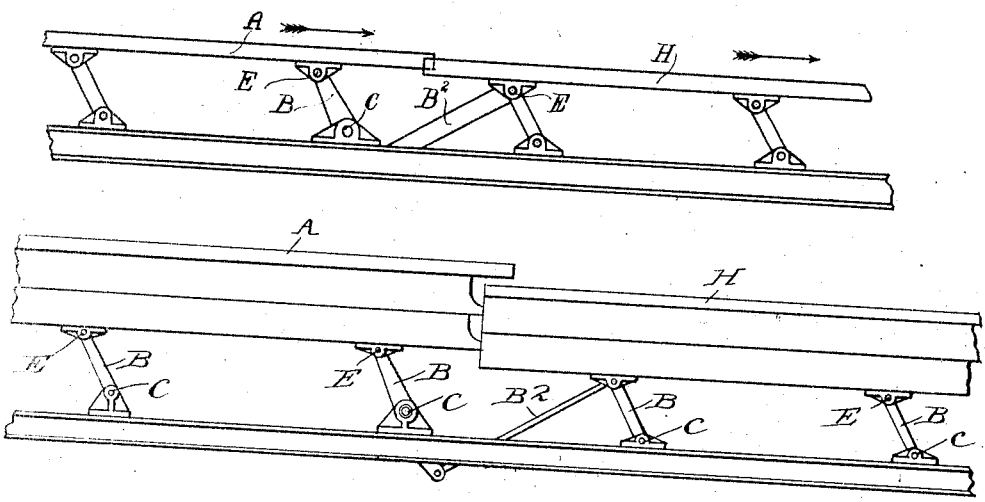
Fig. 4.
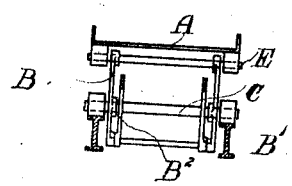
Fig. 2.
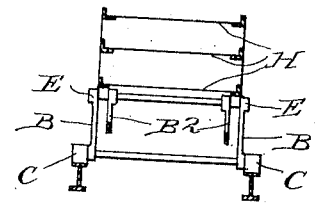
Fig. 5.
Fig. 3.
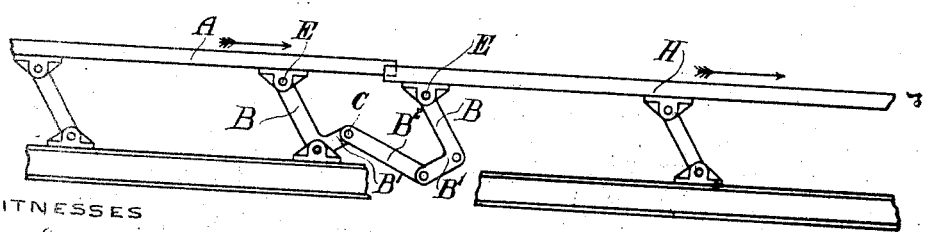
WITNESSES
Cornelius Hoving.
M. Kilpatrick
INVENTOR
BERTRAM NORTON
BY Fran Ollemmel
ATTORNEY

UNITED STATES PATENT OFFICE.

BERTRAM NORTON, OF STOURBRIDGE, ENGLAND.

CONVEYER.

1,041,507.

Specification of Letters Patent.  Patented Oct. 15, 1912.

Application filed November 4, 1910. Serial No. 590,725.

*To all whom it may concern:*

Be it known that I, BERTRAM NORTON, subject of the King of Great Britain, residing at Melbourne House, Worcester Road, Hagley, Stourbridge, in the county of Worcester, England, have invented a new and useful Improvement in Conveyers; and I do hereby declare the following to be a full, clear, and exact description of the same.

My invention comprises improvements in conveyers or screens and refers to that class of such in which there are a pair of troughs both in substantially the same horizontal plane and both supported by inclined levers, the troughs being so connected that the rising weight of one trough is assisted by the falling weight of another trough for the purpose of mutually balancing such troughs, the object of my said invention being to provide an improved and more perfectly balanced conveyer than those heretofore provided.

According to my present invention in a conveyer in which there are two troughs both supported by inclined levers I provide an extension on one or more of the levers, this extension being connected to the other trough or to a lever supporting said trough, so arranged that if one trough is reciprocated its movement is transmitted to the other trough; all being so arranged that when one trough is rising the other trough is falling the rising weight of one trough being assisted by the falling weight of the other trough. The swinging levers for mounting both troughs are inclined in the same direction so that both troughs will convey in the same direction.

Referring to the drawings: Figure 1 is a side elevation of the conveyer constructed according to one form of invention; Fig. 2 is a cross section of same; Fig. 3 is a side elevation of a modification of the said invention; Fig. 4 is an elevation of a conveyer similar to that shown by Figs. 1 and 2 but having a plurality of troughs supported by the levers instead of the single troughs there illustrated; and Fig. 5 is a cross section of same.

In the accompanying drawings at Figs. 1 and 2 the conveyer troughs A and H are shown as being supported by inclined levers B in well known manner and so arranged that when the troughs are reciprocated they will convey from left to right as indicated by arrows on the drawings the conveying being by a longitudinal movement combined with a rising advance, and falling return. The swinging levers are supported above the fulcra C and are attached by a free joint to the troughs at E. According to my invention I continue one or more of these swinging levers on to the opposite side of the fulcrum as indicated by B', this extension B' being connected to the trough H or to a swinging lever supporting this trough by a connecting link B². It will be obvious that when the trough A is falling it will seek to raise the trough H and vice versa when the trough is falling its weight will assist in raising the trough A, the rising weight of one trough being thus assisted by the falling weight of the other one, the two troughs being mutually balancing. In this conveyer the whole of the carrying movement takes place on one side of a vertical line through the fulcra.

At Fig. 3 I have shown a modified form of my invention applied to similarly supported troughs, a supporting lever on each trough being provided with an extension B' at right angles forming as it were two bell crank levers which are connected by a link B², the two troughs being mutually balancing in manner described above. As will be seen the lever B is reciprocated with the trough and moves through only a limited arc of a circle, the balancing relation between the two troughs being unchanged throughout the travel of the troughs.

If desired in place of single troughs there may be several troughs one above the other in well known manner as shown by Figs. 4 and 5.

I wish it to be understood that by balancing I do not necessarily mean a perfect balance. I mean tending to balance in order to reduce the effort required to actuate the conveyer or screen. Thus when I use a weight this may be arranged to balance the empty conveyer or it may balance a conveyer with average load. When two conveyers are arranged to mutually balance I prefer to make the empty conveyers balance and they will then also balance with equal loads.

What I claim then is:

1. In a conveyer the combination of a pair of horizontally disposed troughs, a series of inclined pivoted levers supporting each of said troughs, an extension to one of said levers projecting beyond its pivot, and a link connecting said lever extension to the other trough.

2. In a conveyer, the combination of a trough adapted for reciprocating a certain distance, a fulcrumed lever connected with one of the troughs and provided with an extension at the other end, and a link connected to said extension and operatively connected to the other trough, said extension moving through only a limited angle when the troughs are reciprocated said certain distance.

In testimony whereof, I have signed my name to this specification in the presence of two subscribing witnesses.

BERTRAM NORTON.

Witnesses:
 HAROLD J. C. FORRESTER,
 NORMAN S. BARLOW.